INVENTOR
LOUIS F. LANGHURST

INVENTOR
LOUIS F. LANGHURST
BY Hyde, Meyer, Baldwin & Loran
ATTORNEYS

Patented May 11, 1948

2,441,200

UNITED STATES PATENT OFFICE 2,441,200

METHOD AND APPARATUS FOR SEPARATING FINELY DIVIDED SOLID MATERIAL FROM A FLUID SUSPENSION THEREOF

Louis F. Langhurst, Cleveland, Ohio, assignor to The V. D. Anderson Company, Cleveland, Ohio, a corporation of Ohio Application September 28, 1946, Serial No. 700,022

16 Claims. (Cl. 210—57)

This invention relates to the separation of finely divided solid material from a suspension thereof in a fluid, the present application being a continuation in part of my prior application for Method and apparatus for separating prepared oil-bearing seed oil and solvent mixture, filed August 25, 1944, Serial No. 551,244, now abandoned.

The invention is capable of use for separating any desired solid from any fluid, either gas or liquid. One frequent use is for the separation of solid material from a suitable carrying liquid, such as a volatile solvent employed for the extraction, by solution, of some value from the solid. The liquid may be either lighter or heavier than the solid, but for purposes of illustration, and in no sense of limitation, the invention will be first described in one embodiment suitable for use in the separation of a prepared oil-bearing seed, such as soy beans, from a mixture of seed oil and solvent, such as hexane, which mixture is generally referred to as miscella.

In the process of solvent extraction of oil-bearing seeds the seed is initially cracked and is then rolled out into rather thin flakes in order to increase the surface area and reduce the cross sectional area of the seed to the action of the solvent. The seed thus prepared is introduced into an extractor column or suitable chamber in a counter-flow relation with the solvent. In rolling out the seeds, such as flax and soybeans, there is usually formed with the flakes a certain amount of fine material, which will be hereinafter referred to as "fines" and which fines become entrained with the miscella. Because of these fines many difficulties have been encountered in satisfactorily separating the prepared seed from the miscella.

With many of the extraction processes now in common use a certain portion of the fines and flakes are initially removed from the miscella by a screening operation, with the final separation of the miscella from the prepared seed, or fines and flakes, being accomplished by a filtering operation, which generally precedes a distillation process for separating the seed oil from the solvent in the miscella.

The screening method for initially separating the prepared seed from the miscella has been generally unsatisfactory because of the relatively rapid clogging of the screen and the fact that the fines content in the miscella prior to the filtration process is relatively high. By virtue of this high fines content the filtration cycle is appreciably shortened. In other words when the filters are clean they are capable of filtering a volume of miscella which is greater than the volume of miscella flowing through the miscella screen. However, as the filtration process continues the filter soon becomes filled with the fines so that the volume of miscella filtered is considerably less than the volume of miscella passed through the screens. It is apparent, therefore, that by reducing the fines content in the miscella prior to the filtration process the filters will operate efficiently for a longer period of time. Further, appreciable time is lost and inconvenience encountered by the frequent stopping of the extracting and separating apparatus to clean the screens and the filters. As an example, in one extraction plant, constructed and operating according to prior practice, it has been found necessary to clean the screens and filters every few hours, each cleaning operation removing up to 1,000 pounds or more of finely divided solid matter deposited upon and collected by the filters since the preceding cleaning operation, whereas, in a system of comparable capacity, but employing my improved method and apparatus for separating fines in advance of filtration, cleaning of the screens and filters is not required more often than once in ten days or so, with the collection during such intervals of as low as 500 pounds of fines.

It is an object of this invention, therefore, to provide an improved process and apparatus for separating a prepared seed from miscella.

Yet another object of this invention is to provide for the separation of a prepared seed from miscella so that the fines content in the miscella prior to the filtration process is of a relatively low value, whereby to increase the duration of the filtration cycle.

Another object of this invention is to provide for the separation of a prepared seed from miscella by the complete elimination of the usual miscella settling tanks, and miscella screens now in common use.

Yet another object of this invention is to provide a method and apparatus for continuously settling prepared seed from miscella.

A feature of this invention, when employed for separating solid from liquid material, is found in the provision of apparatus for separating a prepared seed from miscella in which the miscella and dispersed seed therein are introduced adjacent one end of a separating chamber to flow continuously through the chamber, and intermittently through generally vertical passages in the chamber, with such intermittent flow in the passages providing for the miscella and dispersed seed being in a substantially quiescent state within the chamber. The volume of flow through the chamber is such that substantially all of the dispersed seed is separated from the miscella in the upright passages and substantially free miscella flows outwardly from the separating chamber adjacent its discharge end.

Further objects, features and advantages of this invention will become apparent from the following description when taken in connection with the accompanying drawings in which.

Figures 1, 2:
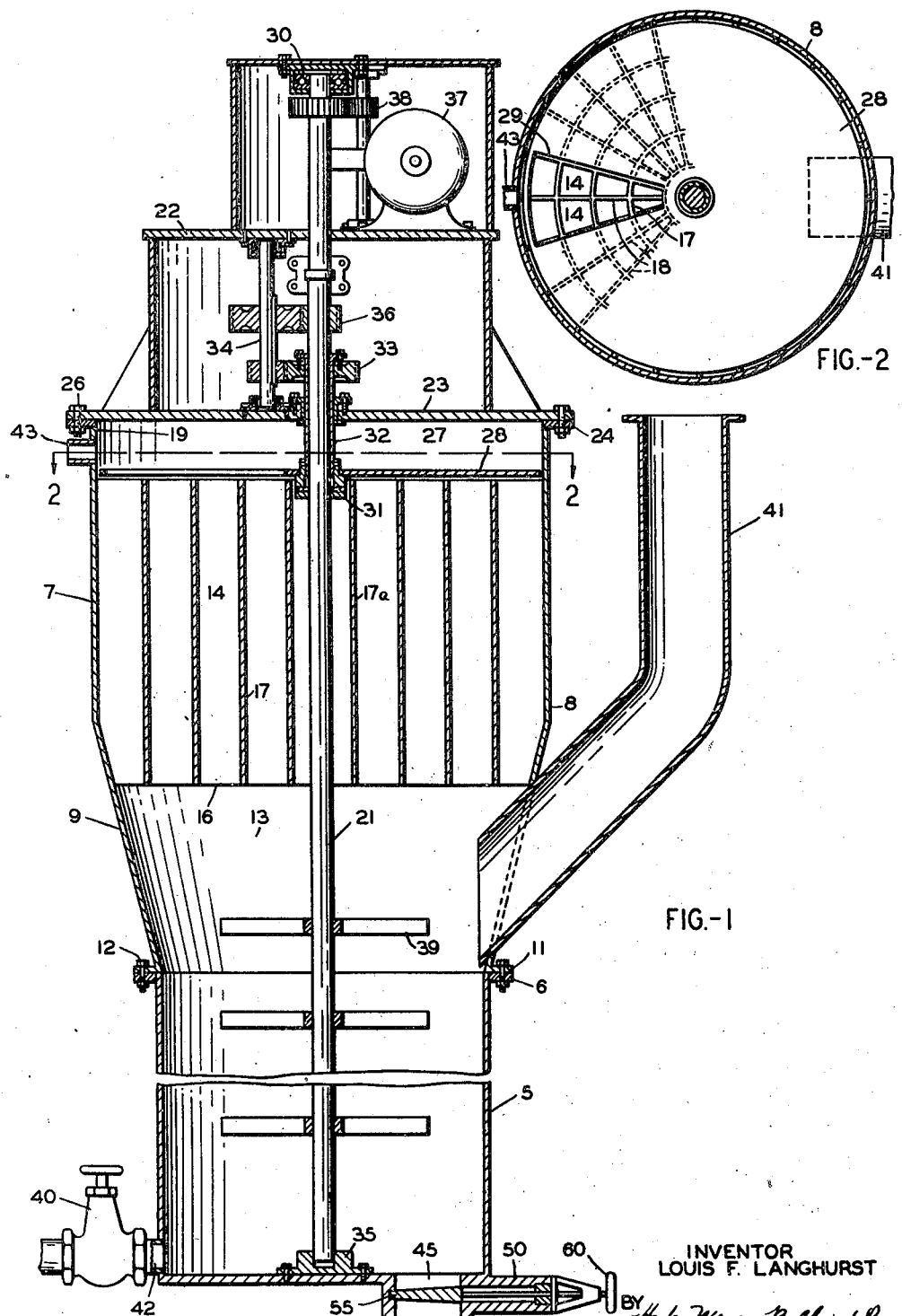
Fig. 1 is a longitudinal sectional view of the separating device of this invention shown in assembly relation with an extractor column.
Fig. 2 is a transverse sectional view taken on the line 2—2 in Fig. 1.

With reference to the drawings, one form of the separating device of this invention is illustrated in Fig. 1 in assembly relation with an extractor column 5 of a cylindrical form, and provided at its upper end with an outwardly extended flange 6 for supporting the separating device indicated generally as 7.

The separating device 7 includes a casing or housing 8 of a cylindrical shape having an inwardly tapered lower portion 9, the bottom of which is of a diameter corresponding to the upper end of the column 5 and is provided with a flange 11 for mating engagement with the flange 6 to which it is connected in a usual manner by bolts 12. Thus as clearly appears in Fig. 1 the column 5 and the casing 8 are in coaxial alignment and open to each other.

The casing 8 defines a settling chamber 13 which is divided into a plurality of upright passageways 14 (Figs. 1 and 2) by a preassembled unit 16 comprised of concentrically arranged spacer rings 17 and angularly spaced radially extended dividing plates 18. The lower end of the preassembled unit 16 is of a tapered construction corresponding to the taper of the lower casing portion 9. In assembly the preassembled unit is inserted into the casing 8 through its upper end and lowered until the tapered portion thereof is in a supported position on the tapered portion 9 of the casing 8. At this supported position of the preassembled unit 16, its upper end is spaced downwardly from the top 19 of the casing 8.

The radially extended dividing plates 18 terminate at the inner spacer ring, indicated as 17a, to provide for the reception of a shaft 21 through the inner spacer ring. The shaft 21 extends upwardly from the settling chamber 13 into a gear housing 22 having a base 23 which constitutes a cover or top for the settling chamber 13. The base 23 is supported at its periphery on a flange 24 provided at the upper end 19 of the casing 8, to which it is connected by bolts 26. By virtue of the location of the preassembled unit 16 below the level of the casing top 19 a space or fluid withdrawal header 27 is formed between the unit 16 and the base 23 for a purpose which will be later noted.

Concentrically positioned within the space 27 for rotation in a horizontal plane is a rotatable disc 28 which is in a covering relation with the upper ends of the passageways 14. A radially extended opening 29 in the disc 28 has its sides diverged outwardly toward the periphery of the disc 28. The disc is rotatably supported on the top surface of a collar 31 fixed on the shaft 21, and is mounted on a sleeve 32 concentric with the shaft 21 and extended upwardly through the space 27 into the gear housing 22. A gear 33 mounted on the sleeve 32 within the housing 22 forms a part of a gear reduction mechanism 34 which includes a gear 36 mounted on the shaft 21.

The shaft 21 is operated by an electric motor 37 through a gear reduction mechanism 38. In the present invention it is contemplated that the gear reduction mechanism 38 provides for a rotation of the shaft 21 at a speed of about 4½ R. P. M. and the gear reduction mechanism 34 provides a rotation of the disc 28 at 1 R. P. M. The portion of the shaft 21 projected downwardly from the settling chamber 13 and into the column 5 carries a plurality of sweeps or spreader arms 39 in an axially spaced relation. The upper end of the shaft 21 is rotatably supported in a thrust bearing 30 mounted on the top of the gear housing 22, while its lower end is rotatable in a step bearing 35 carried on the bottom of the extractor column 5.

In the operation of the extractor and separating device assembly illustrated in Fig. 1 an oil-bearing seed, such as soybean in a prepared or flake form, is introduced into the casing 8 adjacent the lower end of the upright passages 14 through a chute 41 which is inclined downwardly into the casing 8. The solvent for extracting the oil from soybean is usually hexane. Because in this particular instance the solid material is heavier than the solvent liquid and separates by settling downwardly in the liquid, the liquid is introduced into the column 5 at its lower end through an inlet 42, with the supply of the solvent being controlled by a valve 40 connected in the inlet 42. The seed settles downwardly in the column 5 and the solvent flows upwardly through the column 5 so as to be in a counter-flow relation. The settled seed is removed from the column through an outlet 45 at the bottom of the column. The rate of flow or settling of the seed through the column 5 is controlled by a gate valve 50, located in the outlet 45, and having a valve member adjustably movable across the outlet 45 on actuation of a hand wheel 60. The valve member 55 is shown in an outlet closing position in Fig. 1.

The flakes and fine material fed into the casing 8 through the chute 41 are distributed evenly over the full area of the extractor column 5 by the rotating sweeps or spreaders 39. The miscella, resulting from the mixture of solvent and extracted seed oil, is at a maximum concentration of oil adjacent the lower end of the chute 41, and within the lower tapered portion 9 of the casing thus offering sufficient buoyancy to the prepared seed being introduced through the chute to cause a dispersion of the flakes and fine material through the miscella. The casing portion 9 thus functions as a feed header for feeding miscella with seed dispersed therein to the passageways 14.

The present invention, when put to use in the embodiment so far described, accomplishes the separation of the flakes and fines from the miscella by a continuous settling of the flakes from the miscella during the flow of the miscella upwardly through the passages 14. As clearly appears from Fig. 2 the solid portion of the disc 28 closes the upper ends of the passages 14 located therebelow so as to arrest the miscella flow through such passages. This arresting of the miscella flow continues until the radial opening 29 is in communication with a passage. Thus with the disc rotating at a speed of 1 R. P. M. and with the opening 29 being of an angular length of about 15° a flow occurs through each passage for approximately three seconds every minute. During the remaining fifty-seven seconds the flow is arrested by the solid portion of the disc 28. By virtue of this controlled flow through the passages 14 by the disc 28 such flow is intermittent within the passages 14, but continues through the preassembled unit 16 and into the space 27 above the disc 28. In other words, the flow is continuous through the settling chamber 13 and the opening 29 at the top of the settling chamber.

The intermittent flow of the miscella through the passages 14 maintains the miscella and prepared seed dispersed therein in a substantially quiescent state within the passages. By virtue of this quiescent state of the miscella and dispersed seed in the passages 14 a continuous flow of the miscella and seed through the settling chamber is accomplished without turbulence in the miscella. As is well known the buoyancy of the prepared seed within the miscella is such that any slight turbulence in the miscella will act to disperse or entrain the seed therein. Further the rotation of the disc 28 at a speed of 1 R. P. M. effectively eliminates any convection currents being set up within the passages 14. Likewise the speed of rotation of the shaft 21 at 4 R. P. M. within the inner spacer ring 17a reduces channelling of the flakes and turbulence of the miscella travelling upwardly about the shaft 21 within the spacer ring 17a to a negligible factor. The speed of rotation of the disc 28 at 1 R. P. M. is not critical and in some instances can be operated at the speed of the shaft 21.

The rate of removal of the prepared seed from the outlet 45 corresponds to a predetermined rate of flow of the solvent through the inlet 42 such that the volume flow of miscella and prepared seed through the settling chamber is less than the volume flow of miscella capable of being passed through the opening 29. This volume flow in one embodiment of the invention is about eight gallons per minute and is correlated with a length of the passages 14 of about two and one-half feet so that about fifteen minutes is required for the miscella and prepared seed to travel from the lower end of a passage 14 to the upper end of a passage. This fifteen minute time period is sufficient to provide for a large proportion of the fines and flakes being settled from the miscella before the miscella flows outwardly through the opening 29 and into the space 27 so that only a relatively small percentage of fines is dispersed within the miscella at the top of the passages. The miscella flowing into the space 27 is thus substantially free of prepared seed and passes outwardly from the casing 8 through an outlet 43 to a filtering apparatus or the like in which a final separation of the prepared seed from the miscella is made.

It is apparent, of course, that if the passages 14 are made longer the fifteen minute time period above referred to is extended to in turn provide for an increased settling of the prepared seed from the miscella. Although the description refers to miscella as passing through the opening 29 into the space 27, it is to be understood that the miscella leaving the outlet 43 still retains a fines content. In the practice of this invention this fines content has been found to be appreciably lower than the fines content heretofore obtained by the presently commercially used screening operations.

Figure 3:
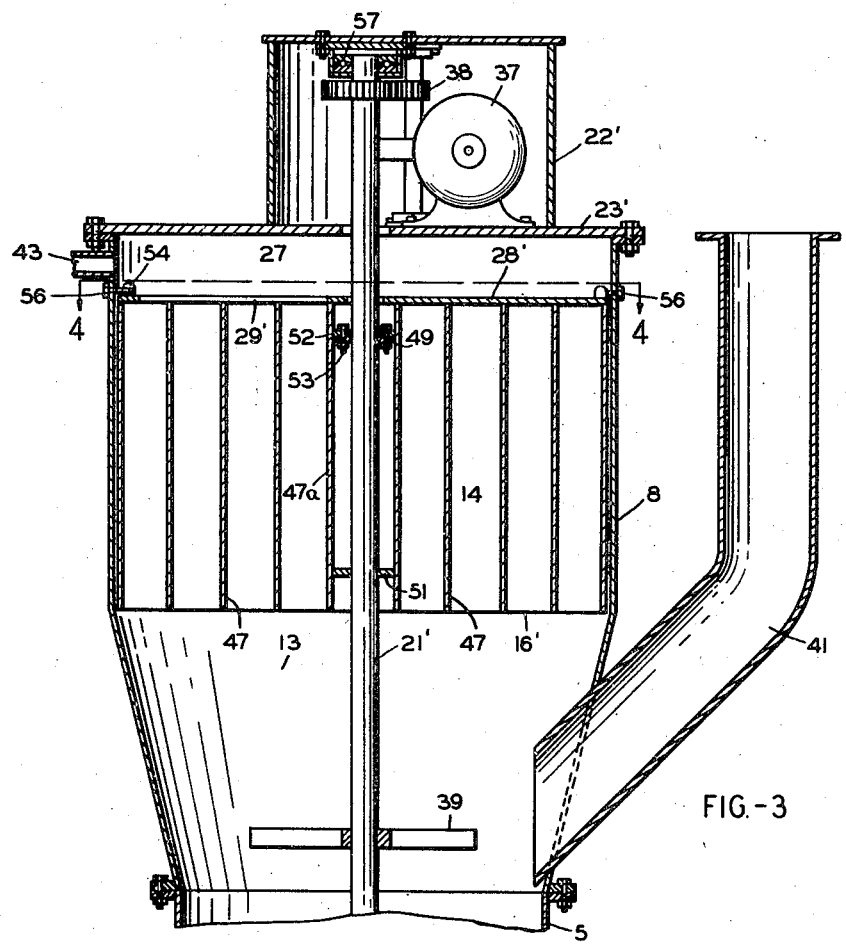
Fig. 3 is illustrated similarly to Fig. 1 and shows a modified form of the invention.
Figure 4:
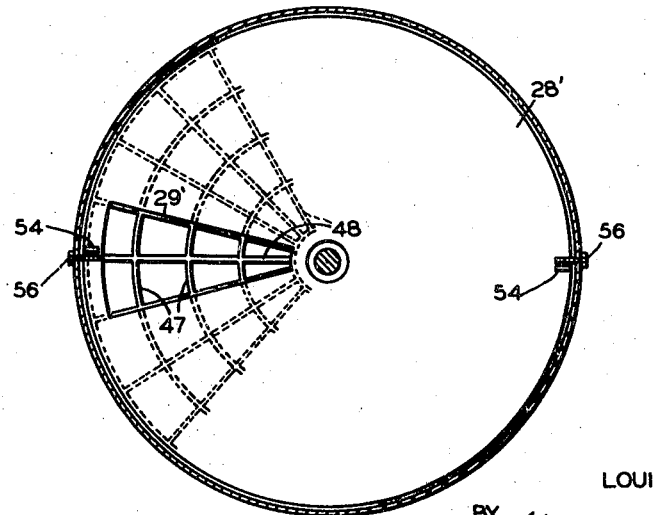
Fig. 4 is a transverse sectional view as seen along the line 4—4 in Fig. 3.

The modified form of the invention shown in Figs. 3 and 4 is similar to the separating device illustrated in Figs. 1 and 2 except that a disc 28' is stationary and a preassembled unit 16' is mounted for rotation with a shaft 21'. Similar numerals of reference, therefore, will be used to designate like parts.

The preassembled unit 16' (Figs. 3 and 4) is of a straight cylindrical form over its complete length and comprised of concentrically arranged spacer rings 47 and radially extended dividing plates 48 forming upright passages 14. The unit 16' is mounted on the shaft 21' for rotation within the settling chamber 13 defined by the casing 8. The shaft 21' is provided with fixed axially spaced collar members 49 and 51 of a size to be received within the inner spacer ring 47a. The lower collar member 51 is in contact engagement with the inner periphery of the spacer ring 47a to guide the rotation of the unit 16' in a clearance relation with the casing 8. The unit 16' is supported on the shaft 21' through an annular ring 52 welded across the inner ring 47a and supported on the upper collar member 49, which is connected to the ring 52 by bolts or the like 53.

The disc 28' is loose on the shaft 21' and rides on the top of the preassembled unit 16' for rotation in a horizontal plane within the space 27. Oppositely arranged on the disc are a pair of upright members 54 adapted to engage corresponding stop members 56 oppositely arranged in the casing 8 to hold the disc against rotation in one direction.

The upper end of the shaft 21' extends through a base 23' of a gear housing 22' which encloses the motor 37 and gear reduction mechanism 38, which is operatively associated with the shaft 21' to rotate the shaft at a speed of about 4 R. P. M. The base 23' constitutes a cover for the casing 8 and defines the top of the space 27. The shaft 21' is rotatably supported in a thrust bearing 57 and its lower end guidably supported in a step bearing (not shown) carried on the bottom of the extractor column 5. The portion of the shaft 21' within the column 5 carries axially spaced spreader arms 39.

In the operation of the settling device in Figs. 3 and 4 the prepared oil-bearing seed is introduced into the casing 8 through the inlet 41 adjacent the lower ends of the passages 14. The solvent for extracting the oil from the seed is introduced into the column 5 through an inlet (not shown) adjacent its bottom in a counterflow relation with the prepared seed introduced through the inlet 41, which seed settles downwardly in the extractor column 5 and is removed from the bottom of the column through an outlet (not shown).

The solid portion of the disc 28' constitutes a cover for the upper ends of the passages 14 thereunder, with the passages 14 being intermittently opened as they are rotated below the opening 29' in the disc 28'. It is seen, therefore, that the flow of miscella and dispersed prepared seed is intermittent through the passages 14 but continuous through the settling chamber 13 and the opening 29' into the space 27 from which it is removed through the miscella outlet 43 for further processing. By virtue of the slow speed of rotation of 4 R. P. M. of the preassembled unit 16' and the intermittent flow of the miscella and dispersed seed through the passages 14, the miscella and disposed seed is retained in a substantially quiescent state and against turbulence and convection currents to provide for an effective settling of the prepared seed from the miscella in the passages 14.

In view of the description of the operation of the settling device in Figs. 1 and 2 a further description of the operation of the settling device in Figs. 3 and 4 is believed to be unnecessary.

From a consideration of the above description it is seen that the invention provides an improved apparatus and method for separating a prepared seed from miscella in a continuous settling operation and without the use of any miscella screens or miscella settling tanks. By virtue of the relatively low fines content in the separated miscella, the cycle of the filtration process, which usually follows the separating process, is appreciably prolonged, so as to reduce the frequency of filter cleaning. Also miscella screens are entirely eliminated so as to do away with the heretofore inconveniences of clogging in such screens. Although the invention has been particularly described as applied to an extractor column it is to be understood that the invention is not to be so limited since the separating device can be used as an individual unit to which miscella with flakes or prepared seed dispersed therein is introduced adjacent the lower ends of the passages 14.

Figure 5:
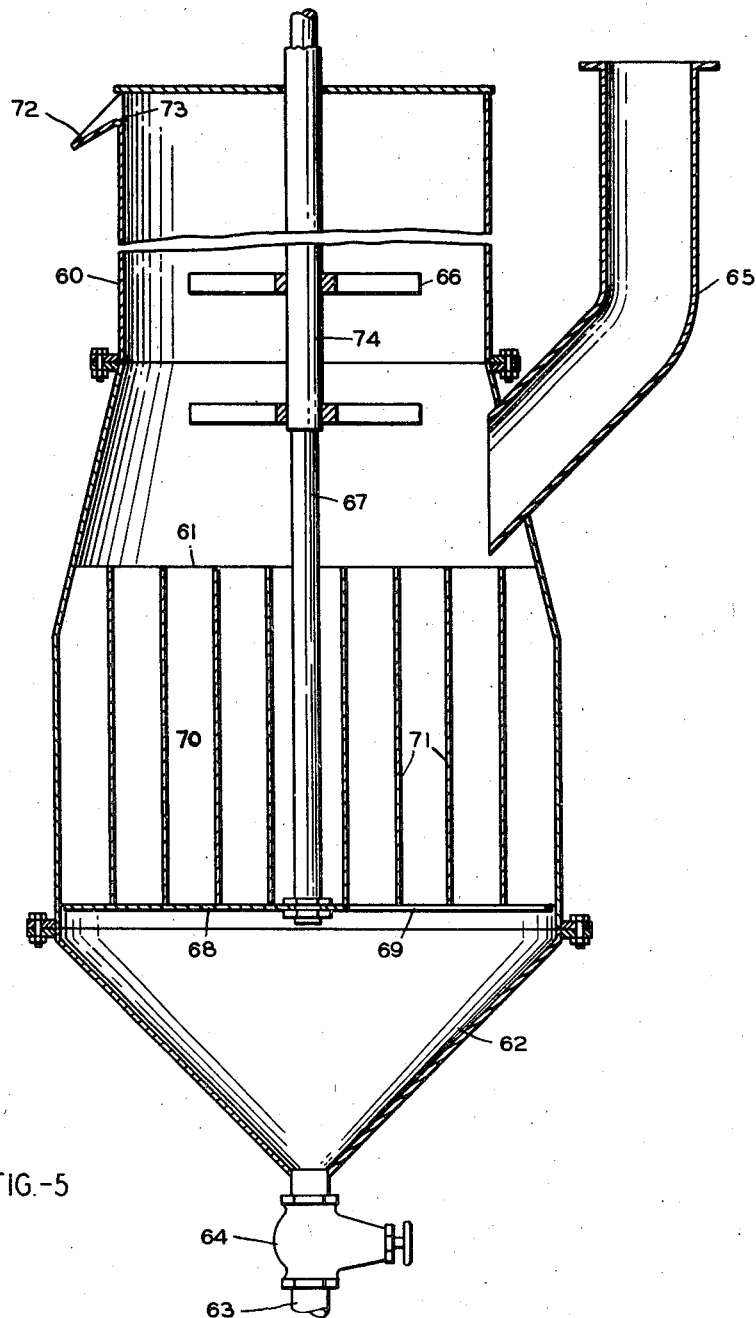
Fig. 5 is a sectional elevation, corresponding generally to Fig. 1, and showing another arrangement.

It is to be understood also that, although the invention has been described above with respect to embodiments thereof in which the solid material is heavier than the fluid and separates by downward movement therein, the invention is not limited except as defined in the claims appended hereto. In this connection, Fig. 5 of the drawings illustrates another arrangement for separating solid matter from a heavier liquid by flotation or upward movement therein.

This arrangement is much like that shown in Fig. 1, but turned upside-down, as it were. The device shown includes a tall cylindrical column 60 provided at its lower end with a fines separating unit, marked generally 61, below which is a tapering bottom portion 62 leading to an outlet 63 for the clear liquid, controlled by valve 64. The material to be treated, consisting of a liquid mixed with coarse and fine fragments of a solid material which is lighter than the liquid and will float upon it, enters by way of a supply pipe 65 above the separating unit. In the upper cylindrical portion of the tower the solid matter rises by flotation, with agitation produced by agitating arms 66 on a central shaft 67. This same shaft extends down through the fines separating unit, below which it is provided with a plate valve device 68, similar to the valve 28 of Fig. 2, and provided with a radially extending opening 69. As the shaft rotates this opening registers in turn with the various openings from a plurality, usually a large number, of small channels 70 between the radially and circumferentially extending imperforate walls 71.

At the top of the tower means is provided for removing the solid matter as it rises to the top and collects on the upper surface of the liquid. As shown, the upper end portion of the tower is provided at one side with an overflow spout 72 providing a weir 73 at the upper level of the liquid and below the extreme upper edge of the tower wall.

The driving mechanism for gate valve 68 and the agitators 66 (not shown) may be of the same general character as that illustrated in Fig. 1, the agitating arms 66 being mounted upon a sleeve 74 surrounding shaft 67 which carries valve 68, so that the valve and agitating arms can be driven separately and at different speeds.

With this arrangement, the mixture of solid and liquid material is supplied through pipe 65 to the zone just above the fines separating unit. The larger particles or fragments of solid material rise promptly through the upper portion of the tower. Valve 64 is adjusted so that the outflow of clear liquid from the bottom of the fines separator is slightly less than the supply through the inlet 65. Thus a fairly small stream of liquid constantly flows out through the spout 72, carrying with it the solid material floating on the top of the liquid. Scrapers or deflectors (not shown) may be employed to assisting in raking the solid material toward the outlet.

A certain proportion of the solid material in suspension in the liquid, in the form of very fine material, tends to travel down through the fines separator. But here, as in the form shown in Fig. 1, constant and slow rotation of the plate valve 69 opens only a few of the vertical channels 70 at the same time. In other words, the downward flow of liquid through the fines separator is continuous and at a uniform rate, as determined by the setting of valve 64, while the flow through the several channels is intermittent or by cycles. Thus, in every one of the channels 70, during any cycle, the liquid is quiescent for a larger portion of the cycle, and during that time the fine material rises in the liquid to join that moving from the inlet 65 to the outlet 72. Thus, the fines separator removes a very large proportion, if not all, of the fines which ordinarily would escape from the outlet 63, making it either unnecessary to filter the clear liquid or, if filtration is employed, considerably increasing the periods between necessary cleaning of the filter and filter cloths.

In all arrangements described, the system efficiently separates fines and reduces the over-all cost of operation for the reasons described.

Other advantages of the invention will be apparent to those skilled in the art.

What I claim is:

1. Apparatus for separating the flakes and fines of an oil-bearing seed from miscella, comprising a casing having its cross sectional area divided into a plurality of upright passageways, means for continuously introducing miscella with dispersed flakes and fines therein into said casing adjacent the lower ends of said passageways for flow upwardly into said passageways, means for intermittently opening and closing said passageways adjacent their upper ends so that said mixture flows intermittently through said passageways and continuously through said casing, whereby the mixture in said passageways is in a substantially quiescent state to provide for the fines and flakes being settled therefrom, and a miscella outlet adjacent the upper ends of said passageways.

2. Apparatus for separating a solid material dispersed within a fluid from the fluid, comprising a chamber having a plurality of imperforate cross walls forming a series of elongated passageways therein, means for introducing said fluid with said material dispersed therein adjacent one end of said passageways for flow therethrough, means for periodically arresting the flow through said passageways in succession so that said flow is intermittent through the passageways and continuous through said chamber, whereby the fluid and material in said passageways is in a substantially quiescent state to provide for the separation of the material from the fluid and the flow of substantially free fluid outwardly from said other end of the passageways, and means for withdrawing the separated solid material.

3. An apparatus for separating solids from a solid-carrying fluid, comprising a plurality of vertically arranged material separating conduits mounted in generally parallel relation for flow of the solid-carrying fluid therethrough, each conduit having imperforate walls and being open at both ends, a chamber for supplying said solid-carrying fluid to one open end of each conduit, means adjacent the other open ends of said conduits for intermittently opening and closing said conduits in succession, to thereby discharge substantially free fluid first from one and then from another of said conduits while the fluid is quiescent in other conduits, and means whereby separated solid material may be withdrawn from said chamber.

4. An apparatus for separating solids from a solid-carrying fluid, comprising a plurality of upwardly extending settling conduits, a solid-carrying fluid feed header communicating with a lower part of each conduit for supplying solid-carrying fluid for upward flow therethrough, a fluid withdrawal header communicating with an upper part of each conduit, and valve means for opening and closing said conduits adjacent the upper part thereof, said valve means being operable to open said conduits in succession.

5. Apparatus for separating solids from a solid-carrying fluid material, comprising an upright housing, a plurality of upright settling conduits in said housing, with the lower portion of said housing constituting a solid-carrying fluid feed header, and the upper portion thereof constituting a fluid withdrawal header, valve means adjacent the upper ends of said settling conduits operable to open said conduits in succession to establish communication of each with said fluid withdrawal header, and means for withdrawing settled solids from the lower portion of said housing.

6. The process of separating solids from a solid-carrying fluid, which consists in introducing the solid-carrying fluid into a separating chamber divided into a plurality of upright passageways at a point adjacent one end of said passageways for flow through said passageways, interrupting the flow of the solid-carrying fluid through said passageways in succession and for a time period sufficient to cause the solids within said passageways to separate from the fluid, removing the clear fluid from the chamber adjacent the other end of said passageways, and withdrawing the separated solids from the chamber.

7. The process of separating a prepared oil-bearing seed from miscella, which consists in introducing a mixture of miscella with prepared seed dispersed therein into one end of a plurality of adjacent upright passageways for flow through said passageways, intermittently arresting the flow of the mixture in said passageways in a timed relation so that one of said passageways is always open, controlling the rate of flow of the mixture through said passageways so that the mixture is in a substantially quiescent state, whereby to cause the separation of substantially all of the prepared seed from the miscella before the mixture reaches the other end of the passageways, and then removing the miscella from adjacent the other end of said passageways.

8. A device for separating a prepared seed from miscella, including a casing portion having a plurality of upright passageways, means for introducing miscella with prepared seed dispersed therein into said casing adjacent the lower ends of said passageways to flow upwardly into said passageways, means providing for an intermittent flow through said passageways, including a member movably supported on said casing portion for movement across said passageways adjacent their upper ends, said member having an opening therein movable across said passageways in succession, with the flow in a passageway being arrested when said opening is out of communication therewith, means for controlling the rate of flow of miscella and dispersed seed through said casing portion, with said rate of flow and the duration of said arrested flow in said passageways being such that the mixture of miscella and dispersed seed is in a substantially quiescent state to cause the prepared seed to settle from the miscella, so that miscella substantially free of prepared seed flows from the upper ends of said passageways, and an outlet portion for the miscella adjacent the upper end of said casing portion.

9. Apparatus for separating prepared seed from miscella, comprising a generally cylindrical upright chamber divided into a plurality of upright passageways, means for introducing miscella with dispersed prepared seed therein adjacent the lower ends of said passageways for flow upwardly into said passageways, a disc rotatably supported for rotation in a horizontal plane across the upper ends of said passageways and having a radially extended opening therein, with the flow taking place in a passageway when said opening is in communication therewith so that the flow is intermittent in each passageway but is continuous through said opening, and means for controlling the volume flow of miscella and dispersed seed into said chamber whereby the miscella and dispersed seed are in a substantially quiescent state within said passageways and the dispersed seed is settled from the miscella before reaching the upper ends of said passageways, said chamber having an outlet portion for receiving the miscella flowing through said opening.

10. A device for separating a prepared seed from miscella, comprising an annular chamber divided into a plurality of upright passageways, means for introducing miscella with dispersed prepared seed therein adjacent the lower ends of said passageways to flow upwardly into said passageways, and means providing for an intermittent flow in said passageways, comprising a rotatable disc coaxial with said annular chamber and rotatable across the upper ends of said passageways, said disc having a radial opening therein, with the flow taking place in a passageway when said opening lies in communication with said passageway, whereby the flow is intermittent through said passageways and continuous through said chamber and the miscella and dispersed seed are in a substantially quiescent state within said passageways, said passageways having a length such that said dispersed seed is settled from the miscella before said dispersed seed reaches the upper end of said passageways, said chamber having outlet means for receiving the miscella flow from said opening.

11. Apparatus for separating a prepared seed from miscella, comprising an upright annular chamber, a rotatable unit having upright passageways therein rotatably supported within said chamber, means for introducing miscella with prepared seed dispersed therein into said chamber adjacent the lower end of said rotatable unit for flow upwardly into said passageways, a stationary cover for the upper ends of said passageways having a radially extended opening therein, with the flow taking place in a passageway when said opening is in communication therewith so that the flow is intermittent through each passageway and is continuous through said opening, and means for controlling the volume flow of miscella and dispersed seed through said chamber whereby the miscella and dispersed seed are in a substantially quiescent state within said passageways and the dispersed seed is settled from the miscella before reaching the upper ends of said passageways, said chamber having an outlet portion for receiving the miscella flowing through said opening.

12. Apparatus for separating finely divided solid material from a liquid with which it is mixed, comprising a casing having a receiving chamber provided with means for supplying the mixture thereto and also with a plurality of generally vertically extending imperforate walls forming a plurality of channels, all of which at one end are in open communication with said receiving chamber to permit free and unimpeded flow from chamber to channel, said casing also being provided with a common discharge chamber to which all of said channels lead, said discharge chamber having an outlet for product liquid, and valve mechanism effective upon all of said channels and arranged always to permit flow at any moment through at least one of said channels and to prevent flow through the remaining channels, said mechanism being operatable in repeated cycles to permit flow through all of the channels sequentially and repeatedly.

13. Apparatus for separating finely divided solid material from a fluid with which it is mixed, comprising an elongated chambered casing provided with means for supplying to its chamber near one end the solid and fluid components of the mixture and for discharging fluid from a point near its other end, so that a stream of the mixture flows continuously through said chamber from end to end, a portion of said casing intermediate its ends being provided with means subdividing its chamber into a plurality of generally parallel channels lying side by side and opening without obstruction into the supply end of said chamber, and means for intermittently and repeatedly by cycles opening various ones of the several channels in turn into the discharge end of the chamber, whereby in each channel during each cycle of operations separation of solid from fluid without appreciable fluid movement occurs during one portion of the cycle and flow of clear fluid toward the discharge end of the chamber occurs during the remaining portion of the cycle.

14. Apparatus for separating finely divided solid material from a liquid with which it is mixed, comprising a casing having a receiving chamber provided with means for supplying the mixture thereto and also with a plurality of generally vertically extending imperforate walls forming a plurality of channels, all which at one end are in open communication with said receiving chamber to permit free and unimpeded flow from chamber to channel, said casing also being provided with a common discharge chamber to which all of said channels lead, said discharge chamber having an outlet for product liquid, and valve mechanism effective upon all of said channels and arranged always to permit flow at any moment through at least one of said channels and to prevent flow through the remaining channels, said mechanism being operatable in repeated cycles to permit flow through all of the channels sequentially and repeatedly, said valve mechanism being located at the discharge end of said channels, whereby the separated solid material by its separation joins the mixture within the receiving chamber.

15. Apparatus for separating solid material from a dispersion thereof in a fluid of lesser density, comprising a chamber having a plurality of imperforate cross walls forming a series of elongated passageways therein, means for introducing said fluid with said material dispersed therein adjacent the lower end of said passageways for flow therethrough, means for periodically arresting upward flow through said passageways in succession so that said flow is intermittent through the passageways and continuous through said chamber, whereby the fluid and material in said passageways is in a substantially quiescent state to provide for the separation by settling of the solid material from the fluid and the flow of substantially free fluid upwardly from said other end of the passageways, and means whereby the separated solid material may be withdrawn.

16. Apparatus for separating solid material from a dispersion thereof in a fluid of greater density, comprising a chamber having a plurality of imperforate cross walls forming a series of elongated passageways therein, means for introducing said fluid with said material dispersed therein adjacent the upper end of said passageways for flow therethrough, means for periodically arresting downward flow through said passageways in succession so that said flow is intermittent through the passageways and continuous through said chamber, whereby the fluid and material in said passageways is in a substantially quiescent state to provide for the separation by flotation of the solid material from the fluid and the flow of substantially free fluid downwardly from said other end of the passageways, means whereby the separated fluid material may be withdrawn from the bottom of said chamber and means whereby the separated solid material may be withdrawn.

LOUIS F. LANGHURST.

REFERENCES CITED

The following references are of record in the file of this patent:

UNITED STATES PATENTS

| Number | Name | Date |
|---|---|---|
| 1,245,366 | Mathesius | Nov. 6, 1917 |
| 1,359,162 | Genter | Nov. 16, 1920 |
| 1,560,796 | Genter | Nov. 10, 1925 |
| 1,708,021 | Lenz et al. | April 9, 1929 |
| 1,943,367 | Champion | Jan. 16, 1934 |
| 2,218,080 | Bottaro | Oct. 15, 1940 |

FOREIGN PATENTS

| Number | Country | Date |
|---|---|---|
| 513,308 | Great Britain | Dec. 28, 1926 |